No. 12,286. REISSUED NOV. 22, 1904.
R. B. BENJAMIN.
PLURAL LAMP SOCKET.
APPLICATION FILED AUG. 25, 1904.
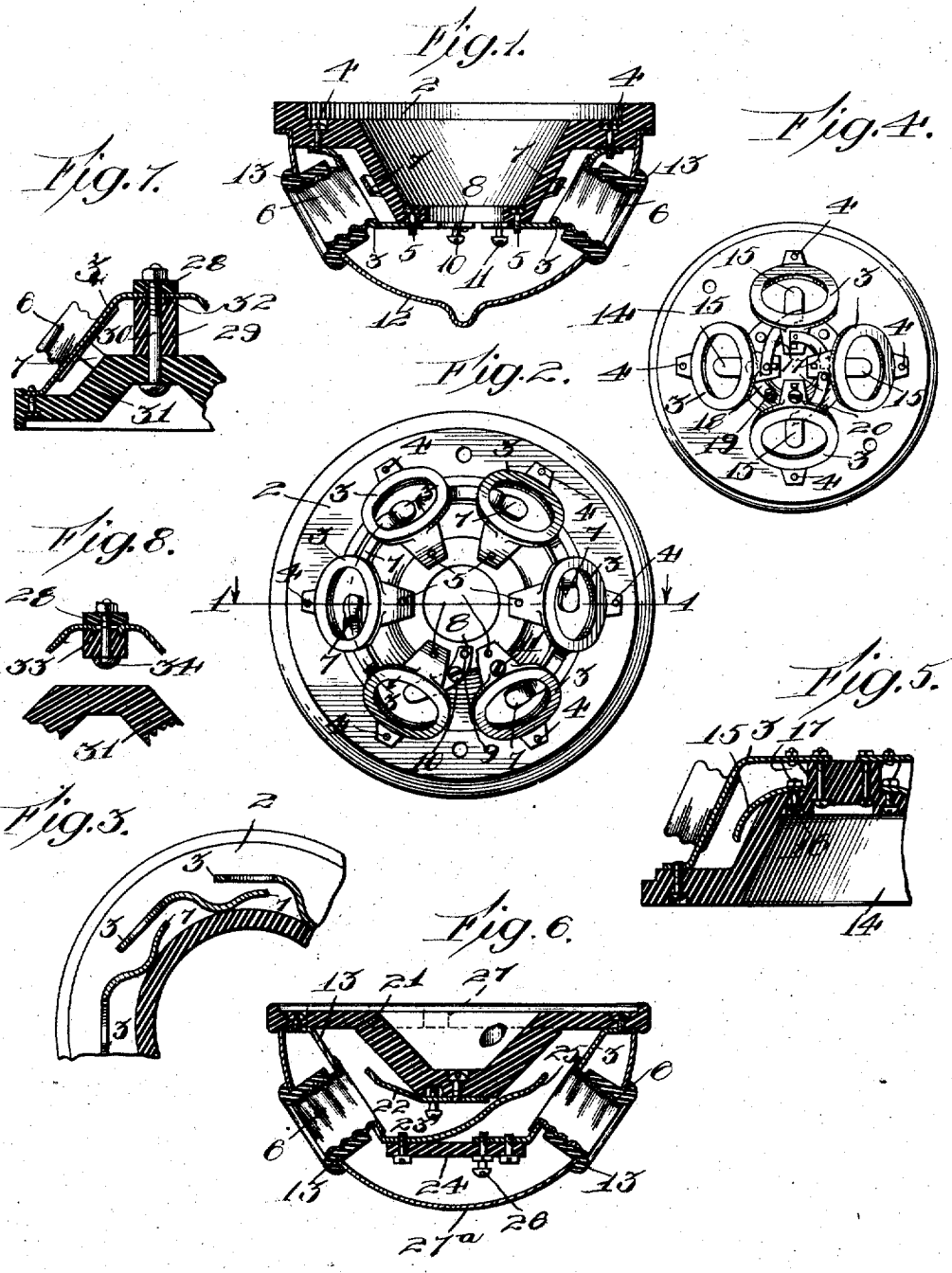
Witnesses:
G. V. Domarus.
Edwin B. H. Towers, Jr.
Inventor:
Reuben B. Benjamin
by Jones & Addington
Attorneys.

No. 12,286. Reissued November 22, 1904.

UNITED STATES PATENT OFFICE.

REUBEN B. BENJAMIN, OF CHICAGO, ILLINOIS, ASSIGNOR TO THE BENJAMIN ELECTRIC MANUFACTURING COMPANY, OF CHICAGO, ILLINOIS, A CORPORATION OF ILLINOIS.

PLURAL LAMP-SOCKET.

SPECIFICATION forming part of Reissued Letters Patent No. 12,286, dated November 22, 1904.

Original No. 759,963, dated May 17, 1904. Application for reissue filed August 25, 1904. Serial No. 222,185.

*To all whom it may concern:*

Be it known that I, REUBEN B. BENJAMIN, a citizen of the United States, residing at Chicago, in the county of Cook and State of Illinois, have invented new and useful Improvements in Plural Lamp-Sockets, of which the following is a full, clear, concise, and exact description, reference being had to the accompanying drawings, forming part of this specification.

My invention relates to improvements in plural lamp-sockets, one object being to provide a construction in which the successive outer and inner contacts of the lamp-holding devices are electrically connected together and another object being to provide improved means for holding the inner ends of the separate contact-plates together and at the same time insulating them.

A further object is the provision of a socket of simple and efficient construction.

To the accomplishment of these objects my invention consists of the parts and combinations of parts hereinafter described, and particularly pointed out in the appended claims.

In the accompanying drawings, in which the same reference characters designate like parts throughout the several views, Figure 1 is a section, and Fig. 2 is a face view, of one form embodying my improvements. Fig. 3 is a section on the line 3 3 of Fig. 2. Figs. 4 and 5 are respectively face and sectional views of a modified form. Fig. 6 is a section of still a different form. Fig. 7 is a detail view of a different method of securing the inner ends of the separate contact-plates, and Fig. 8 is a similar view of a modification.

In Figs. 1, 2, and 3, 2 designates an insulating-base, preferably of porcelain and of the form shown with the sloping sides, upon which base the separate contact-plates 3 of ring form are mounted, their inner ends being secured to the base by screws 4 and their outer ends by the screws 5, passing through the top ring of the base. The threaded metallic shells 6 of the lamp-holding devices are secured to the ring plates 3 by soldering their outwardly-extending flanges thereto. Each of the plates 3 except the last plate of the series is provided with a laterally-extending and preferably integral strip 7, which extends beneath the center of the succeeding plate 3 and forms the center contact for the lamp of that holding device. The strip 7 is bent to engage the side or wall of the base 2 intermediate its ends, whereby the end of the strip forms a spring-contact for the center terminal of the lamp. The first lamp-holding device of the series is provided with a center contact formed from a strip 8, secured to the base by screw 9. A binding-screw 10 serves to secure the end of one circuit-wire to the strip, and a similar screw 11 permits the other to be secured to the last contact-plate of the series. The circuit-conductors themselves are brought in from the rear through the central aperture in the base. The lamps are therefore in series in the electric circuit. Suitable apertures in the base permit the passage of screws to secure the socket in place. A preferably metallic cover 12, having holes for the lamp-holding devices, is provided for the socket and is held in place by the insulating-bushings 13, preferably of porcelain, which are threaded upon the threaded shells 6.

In Figs. 4 and 5 the insulating-base 14 carries a similar arrangement of separate contact-plates 3, provided with center contacts, formed by strips 15, secured by screws or bolts 16 to a ledge formed upon the base. Other strips, 17, are secured to the inner ends of the contact-plates 3 and extend laterally, so as to bear upon the inner ends of the inner contacts, as more clearly shown in Fig. 4. The first inner contact of the series is connected in the circuit by a strip 18, upon which the binding-screw 19 is located to receive one wire of the light-circuit, a similar screw 20 being carried by the last contact-plate of the set to receive the other wires.

Fig. 6 shows a two-light cluster, in which the base 21 carries the center contact 22 of the left-hand lamp-holding device, upon which a binding-screw 23 is located to receive one wire of the electric circuit. The two plates 3 are secured to the base at their inner ends and together at their outer ends by the insulating-plate 24, a strip 25 extending across to a point opposite the center of the other lamp-holding device. The said strip may be bent to engage the raised wall of the base to support the strip 25. A suitable binding-screw 26 serves to secure the other wire of the circuit thereto, whereby the lamps are connected in series when placed in the circuit.

Suitable apertures, such as 27, may be provided in the flat portion of the base, through which to pass suitable securing-screws to fasten the socket to the wall or other support, while other apertures are provided to pass the circuit-wires through. The cover 27[a] is substantially the same as in Fig. 1 and is held in place by the insulating-bushings 13, the edge of the cover being held in place by the raised rib upon the base.

Fig. 7 shows how the outer ends of the contact-plate 3 may be held together by the outer insulating-washer 28, the inner insulating-block 29, upon which the said ends rest, and the bolt 30, passing through the base 31, the block 29, and the washer 28, thus clamping all together when the bolt is tightened. The said outer ends are preferably bent, as at 32, into a depression or depressions in the end of the block 29. Fig. 8 shows substantially the same arrangement, except that the block 33 does not rest upon the base 31 and the bolt 34 is correspondingly shortened.

While I have described the specific construction of the various forms, it is evident that various changes may be made therein, and I therefore do not wish to be so limited; but

What I claim, and desire to secure by Letters Patent, is—

1. A plural lamp-socket, having a plurality of lamp-holding devices having outer and inner contacts, the outer contacts of a device being electrically connected to the inner contact of a succeeding device, substantially as described.

2. A plural lamp-socket, having a plurality of lamp-holding devices having inner and outer contacts, and metallic strips electrically connecting outer contacts with inner contacts of succeeding devices, substantially as described.

3. In a plural lamp-socket, the combination with a base, of a plurality of lamp-holding devices carried thereby, outer and inner contacts for each of said devices, and means for electrically connecting the outer contacts of a plurality of devices with inner contacts of succeeding devices, substantially as described.

4. In a plural lamp-socket, the combination with a base, of a plurality of lamp-holding devices carried thereby, outer and inner contacts for each of said devices, and means for electrically connecting the outer contact of one of said devices with the inner contact of the succeeding device, substantially as described.

5. In a plural lamp-socket, the combination with an insulating-base, of a plurality of lamp-holding devices carried thereby, outer and inner contacts for each of said devices, and metallic strips for electrically connecting outer contacts of said devices with the inner contacts of succeeding devices, substantially as described.

6. In a plural lamp-socket, the combination with an insulating-base, of a plurality of lamp-holding devices carried thereby, outer and inner contacts for each of said devices, metallic strips for electrically connecting outer contacts of said devices with inner contacts of succeeding devices, and a cover for said devices having apertures to accommodate the lamp-holding devices, substantially as described.

7. In a plural lamp-socket, the combination with an insulating-base, of a plurality of lamp-holding devices carried thereby, outer and inner contacts for each of said devices, metallic strips for electrically connecting outer contacts of said devices with inner contacts of succeeding devices, a cover for said devices having apertures to accommodate the said devices, and insulating-bushings between the cover and the metallic shells of said lamp-holding devices substantially as described.

8. In a plural lamp-socket, the combination with an insulating-base, of a plurality of lamp-holding devices carried thereby, outer and inner contacts for each of said devices, metallic strips for electrically connecting outer contacts of said devices with inner contacts of succeeding devices, a cover for said devices having apertures to accommodate said devices, and insulating-bushings between the cover and metallic shells of the lamp-holding devices, said bushings serving to hold the cover in place on the socket, substantially as described.

9. A plural lamp-socket, having a plurality of lamp-holding devices having outer and inner contacts, and metallic strips formed integral with outer contacts and connecting the same with the inner contacts of succeeding devices, substantially as described.

10. A plural lamp-socket, having a plurality of lamp-holding devices having inner and outer contacts, outer contacts of said devices being formed integral with the inner contacts of succeeding devices, substantially as described.

11. In a plural lamp-socket, the combination with a suitable base, of a plurality of contact-plates mounted thereon in an outstanding position with the inner ends thereof secured to said base, said plates having their outer ends arranged away from said base and suitably connected with each other to firmly retain said plates in position.

12. In a plural lamp-socket, the combination with a suitable base, of a plurality of inclined contact-plates mounted thereon in an outstanding position with the inner ends thereof secured to said base, said plates having their outer ends arranged away from said base and suitably connected with each other to firmly retain said plates in position, and a lamp-receiving shell carried by each of said plates.

13. In a plural lamp-socket, the combination with a suitable base, of a plurality of separate contact-plates mounted thereon in an outstanding position with the inner ends thereof secured to said base, said plates having their outer ends arranged away from said base and connected by an insulating member to firmly retain said plates in position.

14. In a plural lamp-socket, the combination with a suitable base, of a plurality of separate contact-plates mounted thereon in an outstanding position with the inner ends thereof secured to said base, said plates having the outer ends thereof approaching each other and arranged away from said base, and an insulating member connecting said approached outer ends to firmly retain said plates in position and insulate the same from each other.

15. In a plural lamp-socket, the combination with a suitable base, of a plurality of separate contact-plates mounted thereon in an outstanding position and having the inner ends thereof secured to said base, said plates having the outer ends thereof approaching each other and arranged away from said base, and separate insulating members having the outer ends of said plates secured between the same to firmly retain said plates in position.

16. In a plural lamp-socket, the combination with a suitable base, of a plurality of separate plates having their outer ends approaching each other, and an insulating member connecting said approached ends and arranged away from said base, whereby said plates are held in an outstanding position to said base, substantially as described.

17. In a plural lamp-socket, the combination with a suitable base, of a plurality of separate plates having their outer ends approaching each other and arranged away from said base, an insulating member secured upon both sides of said ends, and a bolt passing through said members to clamp them together to firmly hold and support the ends of said plates, substantially as described.

18. In a plural lamp-socket, the combination with a plurality of separate plates having their outer ends approaching each other and arranged away from the base, insulating members secured upon both sides of said ends, a lug formed upon the outer ends of each of said plates, and entering a corresponding recess formed between said members, and a bolt passing through said members to clamp them together and firmly support the same, substantially as described.

19. In a plural lamp-socket, the combination with a suitable base, of a plurality of contact-plates carrying threaded shells adapted to receive the lamp-bases, and an inner contact for each of said shells, some of said shells being electrically connected with the inner contacts of the succeeding shells.

20. In a plural lamp-socket, the combination with a suitable base, of a plurality of annular contact-plates having arms or lugs at the opposite ends and adapted to be held in oblique positions, a threaded shell mounted upon each plate, an inner contact for each shell, and suitable electrical connections between the shells and the inner contacts of the succeeding shells, substantially as described.

In witness whereof I have hereunto subscribed my name in the presence of two witnesses.

REUBEN B. BENJAMIN.

Witnesses:
M. R. ROCHFORD,
EDWIN B. H. JONES, JR.